US007117322B2

(12) United States Patent
Hochberg et al.

(10) Patent No.: US 7,117,322 B2
(45) Date of Patent: Oct. 3, 2006

(54) METHOD, SYSTEM, AND PROGRAM FOR RETENTION MANAGEMENT AND PROTECTION OF STORED OBJECTS

(75) Inventors: Avishai Haim Hochberg, San Jose, CA (US); Toby Lyn Marek, Santa Clara, CA (US); David Maxwell Cannon, Tucson, AZ (US); Howard Newton Martin, Tucson, AZ (US); Donald Paul Warren, Jr., Tucson, AZ (US); Mark Alan Haye, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 10/658,487

(22) Filed: Sep. 8, 2003

(65) Prior Publication Data

US 2005/0055518 A1 Mar. 10, 2005

(51) Int. Cl.
*G06F 12/00* (2006.01)
(52) U.S. Cl. .............. 711/160; 711/161; 711/159; 711/154; 711/134; 711/133; 707/203
(58) Field of Classification Search ................ 711/160, 711/133, 134, 154, 159, 161; 707/203
See application file for complete search history.

(56) References Cited

U.S. PATENT DOCUMENTS

| 4,899,299 | A |   | 2/1990 | MacPhail |
| 5,051,891 | A |   | 9/1991 | MacPhail |
| 5,107,419 | A |   | 4/1992 | MacPhail |
| 5,132,954 | A |   | 7/1992 | Kulakowski et al. |
| 5,144,556 | A |   | 9/1992 | Wang et al. |
| 5,146,561 | A |   | 9/1992 | Carey et al. |
| 5,233,576 | A |   | 8/1993 | Curtis et al. |
| 5,506,986 | A | * | 4/1996 | Healy .......................... 707/204 |
| 5,689,699 | A |   | 11/1997 | Howell et al. |
| 5,813,009 | A | * | 9/1998 | Johnson et al. ............. 707/100 |
| 5,983,239 | A | * | 11/1999 | Cannon ....................... 707/200 |
| 6,185,576 | B1 |   | 2/2001 | McIntosh |
| 6,272,086 | B1 |   | 8/2001 | Jaquette et al. |
| 6,324,569 | B1 |   | 11/2001 | Ogilvie et al. |
| 6,330,572 | B1 |   | 12/2001 | Sitka |
| 6,553,365 | B1 |   | 4/2003 | Summerlin et al. |
| 6,886,020 | B1 | * | 4/2005 | Zahavi et al. ................ 707/204 |

(Continued)

FOREIGN PATENT DOCUMENTS

WO    WO 0058865    10/2000

OTHER PUBLICATIONS

IT Web, "EMC Centera Compliance Edition Raises Bar for Regulatory Compliance", EMC SA Press Release on ITWeb, Jun. 23, 2003, pp. 1-2 [retrieved online Sep. 3, 2003] http://www.itweb.co.za/sections/QuickPrint/Print.asp?StoryID=134765.

(Continued)

*Primary Examiner*—Stephen C. Elmore
(74) *Attorney, Agent, or Firm*—David W. Victor; Konrad Raynes & Victor LLP

(57) ABSTRACT

Provided are a method, system, and program for managing retention of stored objects. A modification request is received with respect to a stored object. A determination is made as to whether a retention protection mechanism is set and a storage policy associated with the stored object is processed to determine whether the stored object has expired according to the storage policy in response to determining that the retention protection mechanism is set. The modification request is allowed to proceed in response to determining that the stored object has expired.

42 Claims, 8 Drawing Sheets

U.S. PATENT DOCUMENTS

| | | |
|---|---|---|
| 2002/0010708 A1 | 1/2002 | McIntosh |
| 2002/0049643 A1 | 4/2002 | Church |
| 2002/0143598 A1* | 10/2002 | Scheer .................... 705/9 |
| 2002/0156767 A1 | 10/2002 | Costa et al. |
| 2003/0101072 A1 | 5/2003 | Dick et al. |
| 2003/0126215 A1 | 7/2003 | Udell et al. |
| 2003/0182304 A1 | 9/2003 | Summerlin et al. |
| 2004/0006589 A1* | 1/2004 | Maconi et al. ............. 709/202 |
| 2004/0117407 A1* | 6/2004 | Kumar et al. ............... 707/200 |
| 2004/0167898 A1* | 8/2004 | Margolus et al. ............ 707/10 |
| 2005/0055519 A1 | 3/2005 | Stuart et al. |
| 2005/0076066 A1 | 4/2005 | Stakutis |

OTHER PUBLICATIONS

EMC Corporation, "EMC Centera Compliance Edition", 2003, pp. 1-4.

EMC Corporation, "Centera Compliance Edition: Understanding and Addressing the Challenges of Compliance and Discovery", White Paper, Apr. 2003, pp. 1-10.

"Retention Management Program", Reproduced from Research Disclosure, Jul. 1986, No. 267, Kenneth Mason Publications, Ltd, England.

"Method for Indicating Calendar Entry Which Deletes a Document", Reproduced from Research Disclosure, May 1993, No. 05, Kenneth Mason Publications, Ltd, England.

* cited by examiner

Object Entry

Expiration Entry

METHOD, SYSTEM, AND PROGRAM FOR RETENTION MANAGEMENT AND PROTECTION OF STORED OBJECTS

BACKGROUND OF THE INVENTION

1. Field of the Invention

The present invention is related to a method, system, and program for retention management and protection of stored objects.

2. Description of the Related Art

Organizations may need to retain and archive electronic documents and records in storage for an extended period of time due to internal or external information retention policies. For instance, government regulators may require that certain files remain archived for a minimum period of time. Companies in regulated industries, such as securities and financial organizations, defense contractors, etc., may be required to archive certain documents. Further, government agencies may also be required to archive files. Yet further, organizations subject to an audit or investigation, such as litigation, may also be subject to information retention requirements. A storage system often includes some archival software to manage the archival of files at different locations that are retained according to a policy. Such archival software may maintain a database of archived files.

When an object is archived, a record is added to the archival database, where the record identifies the archived object and a retention policy for the archived object. The retention policy specifies a retention period during which the file is archived. When the retention period expires, the archived file may be removed. With such systems, an administrator or user may inadvertently or intentionally remove an archived object or modify the retention policy for an object in a manner that would violate the current retention policy, which may be imposed as a result of government regulation or organization policy.

SUMMARY OF THE PREFERRED EMBODIMENTS

Provided are a method, system, and program for managing retention of stored objects. A modification request is received with respect to a stored object. A determination is made as to whether a retention protection mechanism is set and a storage policy associated with the stored object is processed to determine whether the stored object has expired according to the storage policy in response to determining that the retention protection mechanism is set. The modification request is allowed to proceed in response to determining that the stored object has expired.

In further implementations, the storage policy specifies a retention period, wherein determining whether the stored object has expired comprises determining whether a difference between a current time and a retention period start exceeds the retention period.

In additional implementations, the modification request comprises a request to delete the object. In such case, a determination is made as to whether a deletion hold is set for the stored object. The deletion request is blocked if the deletion hold is set regardless of whether the stored object has expired.

In still further implementations, a determination is made as to whether the modification request is to increase the retention period specified for the storage policy in response to determining that the retention protection is set and the stored object has not expired. The modification request to increase the retention period is allowed to proceed if the modification request is determined to increase the retention period. The modification request is blocked if the modification request is determined to not increase the retention period.

Further provided are a method, system, and program for storing objects. An object to store and a storage policy associated with the object are received, wherein the storage policy specifies a retention period. Object information is generated for the received object indicating a storage policy including a retention period, wherein the stored object expires when a difference between a current time and a retention period start exceeds the retention period. A determination is made as to whether the storage policy comprises an event based retention policy, wherein for the event based retention policy, the retention period start commences in response to receiving an event signal, and wherein the object having an event based retention policy does not expire until after the event signal is received and the difference between the current time and the retention period start exceeds the retention period. Status information is set to indicate that the event signal has not been received in response to determining that the storage policy comprises one event based retention policy.

In further implementations, an event signal associated with one stored object having one event based retention policy is received and a determination is made of the object information for the stored object associated with the event signal. Expiration information is generated indicating the retention period start as a current time and the retention period specified in the storage policy in the determined object information in response to receiving the event signal.

In further implementations, the retention period start commences for a specified object in response to determining that storage policy for the specified object does not comprise one event based retention policy or in response to receiving the event signal for the specified object.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
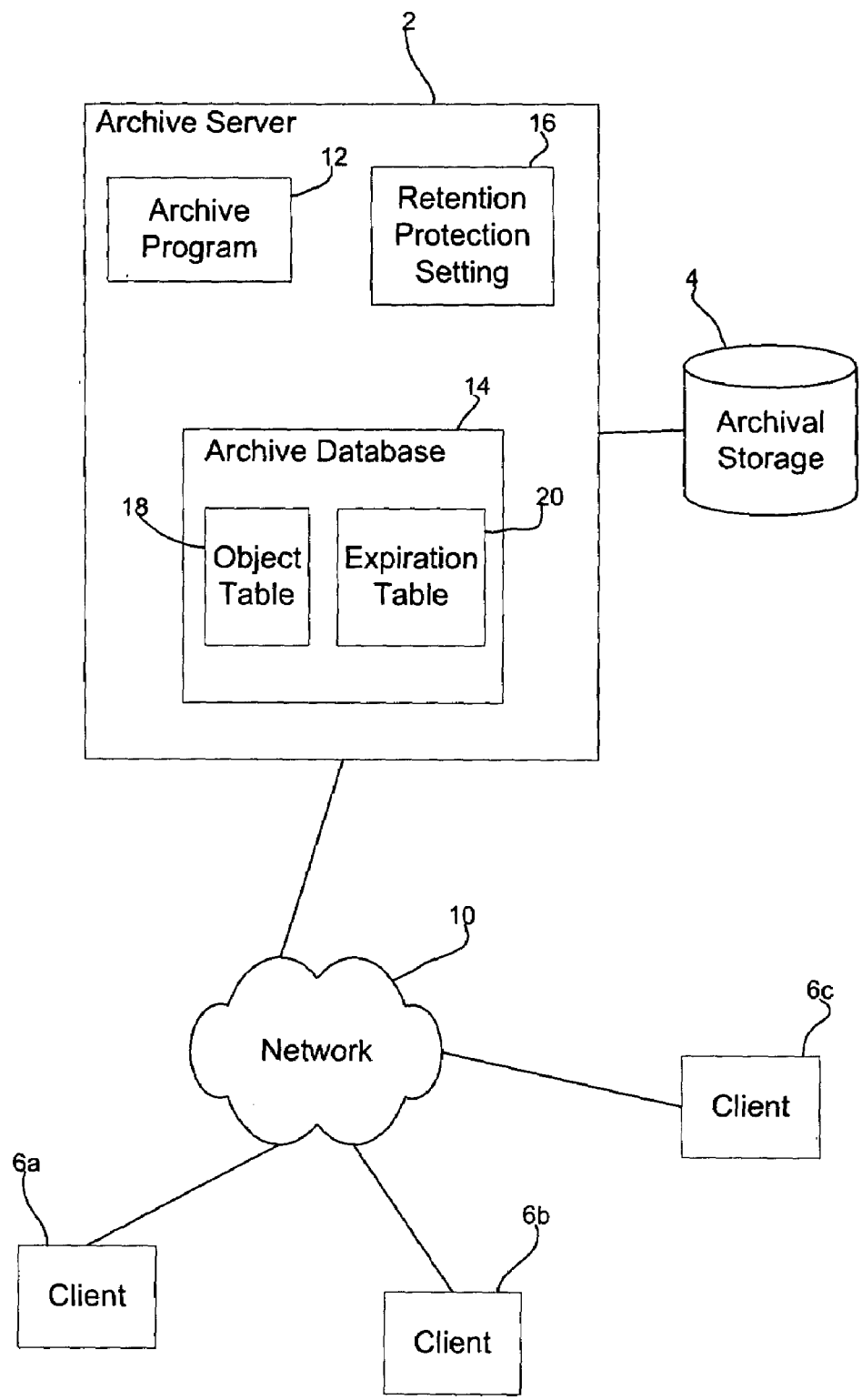
FIG. 1 illustrates a computing environment in which embodiments of the invention are implemented.

FIG. 1 illustrates a computing environment in which embodiments of the invention are implemented. An archive server 2 maintains archive objects in archival storage 4, where the archived objects may originate from client systems 6a, 6b, 6c, where the clients 6a, 6b, 6c communicate objects to the archive server 2 over a network 10. The archive server 2 includes an archive program 12 which performs archive related operations, an archive database 14 maintaining records providing information on archived objects, and a retention protection setting 16 controlling the extent to which the archive program 12 permits users to remove or modify information in the database 14 and archived objects from the archival storage 4. In FIG. 1, the retention protection setting 16 comprises a global variable applying across all objects. In additional implementations, there may be separate protection settings for single objects or groups of objects, all objects in a node, filespace, from a client, etc. An object may comprise any data structure known in the art including data, such as a file, database, record, etc. All archive related operations are managed by the archive program 12 to ensure compliance with a configured archival policy. The archive database 14 may include an object table 18 having an entry (record) for each archived object providing information on the object and an expiration table 20 having one entry (record) for each initiated or expired retention period running with respect to one archived object.

The archive server 2 may be implemented as a server class machine, and the client systems 6a, 6b, 6c may comprise any computing device known in the art, such as a server class machine, mainframe, workstation, desktop computer, handheld computer, etc. The data archived from the client systems 6a, 6b, 6c may comprise data in a database, application program data, files in a filesystem, etc. The archival storage 4 may comprise any mass storage device known in the art, such one or more interconnected disk drives configured as a Redundant Array of Independent Disks (RAID), Just a Bunch of Disks (JBOD), Direct Access Storage Device (DASD), as a tape storage device, e.g., a tape library, or etc. The network 10 may comprise any interface between storage and a host known in the art, such as a network connection (e.g., Ethernet, wireless ethernet, Fibre Channel, etc.) or any other network or storage transfer protocol known in the art.

In certain embodiments, different archival policies may be associated with the archived objects. The retention policy specifies a retention period during which the object must be maintained in archival storage 4. Following the duration of the retention period, the archived object is expired to allow the storage space to be reclaimed during a clean-up, reclamation or other space management operation. The object and the corresponding object entry 30 in the object table 18 and any expiration entry 40 for the object are removed. With certain archival policies, the retention period may commence immediately when adding the object to the archival storage and an entry to the archive database 14 providing information on the archived object.

An event based retention archival policy specifies that the retention period for the object does not commence until the occurrence of an event. Upon receiving a signal of the occurrence of the event, the archive program 12 would begin the retention period for the object having such event based retention archival policy. An event driven policy thus defers the beginning of the retention period counting until the occurrence of an event. For instance, employee information may be archived, but regulations may specify that after an employee leaves, information for that employee must be archived for a retention period of specified number of years. In such case, the event based retention policy may specify to commence the retention period upon being alerted of the event, which may comprise the separation of the employee from the organization. A retention period of zero for an event based retention policy would mean that the object expires immediately upon occurrence of the event. Further, an event based retention policy may specify a minimum retention period, in addition to the general retention period, such that the object cannot be expired before the minimum retention period expires, regardless of the event based retention period. Thus, if the time that has passed since the event signal occurs and the retention period time is less than the minimum retention period, then the object will not expire until the end of the minimum retention period. The minimum retention period may run from the time the object entry 30 was added to the archive database 14 and storage 4, whereas the general event based retention period runs from when the event signal is received.

A deletion hold policy may be specified for an object to override the retention policy to prevent removal of an object even if the object would have expired according to the retention period defined in the archival policy for the object. Thus, if some event occurs that requires that the object remain archived regardless of any previously defined archival policy, then a deletion hold policy may be placed on that object to prevent expiration and removal of the archived object. For instance, if litigation commences against an employee that has departed, where an event based retention period is defined for the records of that employee to begin running when the employee departs (the event), then a deletion hold policy placed on the archived objects for that employee would prevent the expiration and removal of the archived objects for that employee regardless of the event based retention policy. The deletion hold applied to an archived object may subsequently be removed to allow that object to expire according to the archival policy defined for that object.

Figure 2:
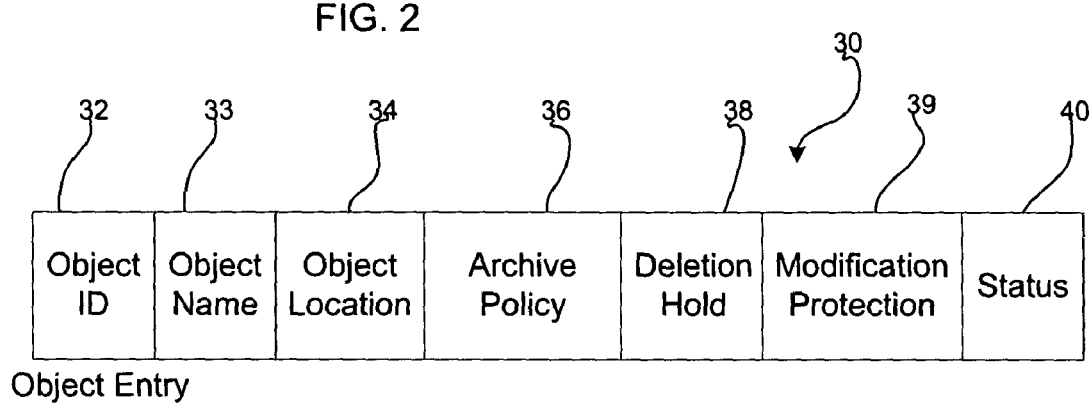
FIGS. 2 and 3 illustrate information maintained for archived objects in accordance with implementations of the invention.

Further, a retention protection policy may be applied to the archive server 2 by setting the retention protection setting 16. Activating this setting 16 would cause the archive program 12 to inhibit or deny any request that seeks to remove or modify an archived object or remove any record in the archive database 14 for an archived object that has not expired according to the archive policy. A request to remove an archived object can be in the form of a request to remove that specific archived object or delete a volume or filespace including the specified archived object, As discussed, the archive database 14 may include a object table 18 and expiration table 20. FIG. 2 illustrates information included in an entry 30 in the object table 18 providing information on an object archived in the archival storage 4. Each archive object entry 30 may includes:

object identifier (ID) 32: a unique identifier of an archived object, which comprises a unique database entry identifier or record identifier.

object name 33: the fully qualified name of the object as referenced by the client program.

object location 34: indicates location of the archived object in the archival storage 4.

archive policy 36: indicates an archive policy for the object, which defines a retention period, and may also define an event based retention policy, deletion hold, minimum retention period, etc. Multiple objects may be associated with the same retention policy so that the same archival policy applies to those objects. The archive policy field 36 included in the entry 30 may comprise a reference to an archive policy in a table or other structure that provides an executable definition of the archive policy. Alternatively, the archive policy field 36 may comprise a definition or code defining the actual policy.

deletion hold 38: provides an override to the archive policy to prevent removal of the object regardless of the retention period specified in the archive policy. In certain implementations, the retention period may run and indicate the object being expired, but the deletion hold would prevent the removal of this "expired" object from the archive. Thus, when the deletion hold is removed, the result of the archive policy would come into effect, so that if the object expired during the deletion hold according to the archive policy, the object would be in an expired state after the deletion hold is released. Further, if the object expired according to policy while the deletion hold is in effect, then the object would be eligible for deletion after the deletion hold is released.

Modification Protection 39: A flag indicating whether modifications to attributes can be made, such as permissions, ownership, etc. Although this setting is shown as applied to a specific object, a modification protection setting can be used to apply to all objects or to a group of objects.

status 40: indicates the status of the object with respect to the archive policy. An "active" status indicates that the retention period is running for that object; an "expired" status indicates that the retention period has completed making the object eligible for reclamation or removal; and "pending" status may be used for event based retention policies to indicate that the event has not yet occurred that commences the retention period.

Figure 3:
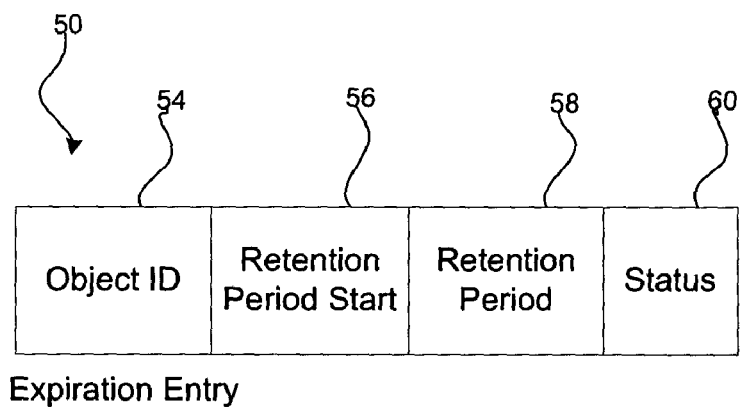

FIG. 3 illustrates an example of the information that may be included in an expiration entry 50 in the expiration table 20. An expiration record 50 may include:

Object ID 54: the unique identifier of the object entry 30 to which the expiration record applies.

Retention Period Start 56: indicates a time, which may comprise any timestamp or clock value used by the archive server 2, that the retention period began running. As discussed, an archive policy may commence a retention period immediately when the object is archived or specify an event based retention policy where the retention period commences upon the occurrence of an event.

retention period 58: indicates the duration of the retention period associated with the policy.

status 60: indicates the status of the expiration entry, where status of "active" indicates that the retention period is running and the object has not yet expired and "expired" indicates that the retention period has completed and the object has not yet expired.

Figure 4:
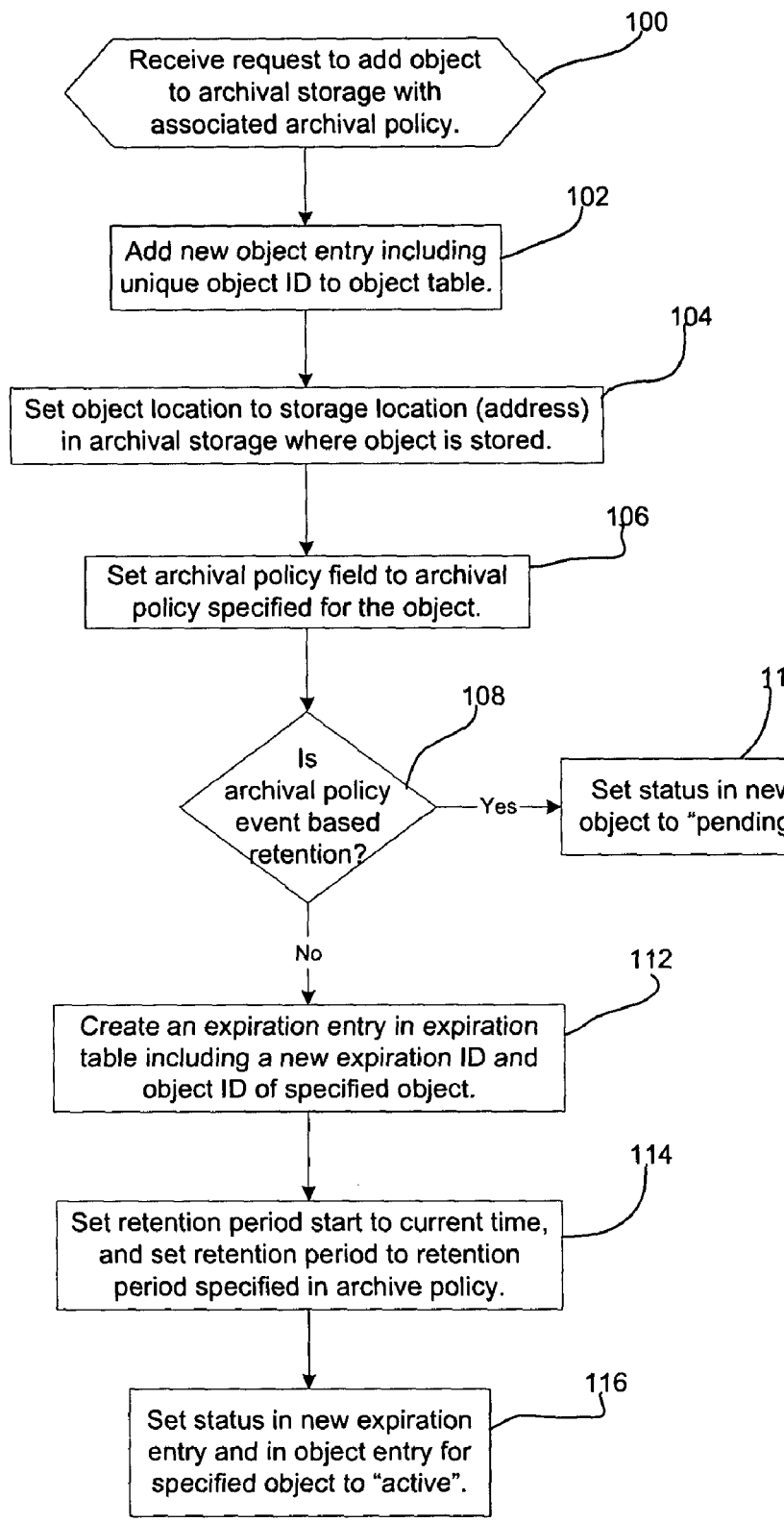
FIGS. 4, 5, 6, 7, and 8 illustrate operations performed to manage archived objects in accordance with implementations of the invention.

FIGS. 4, 5, 6, and 7 illustrate operations performed by the archive program 12 to manage archival storage. FIG. 4 illustrates operations the archive program 12 performs when an object is added to archival storage 4. Control begins at block 100 when the archive program 12 receives a request to add an object to the archival storage 4 with an associated archival policy. An object may be transmitted by an administrator or user from one of the clients 6a, 6b, 6c. Alternatively, the client computers 6a, 6b, 6c may run client archive programs that automatically transfer specified objects to the server archive program 12 to add to archival storage. The archival policy specified with the object specifies a retention period and whether that period begins when the object is initially archived or an event occurs. Upon receiving the request, the archive program 12 adds (at block 102) a new object entry 30 (FIG. 2) including a unique object ID 32 to the object table 18. The object location 34 is set (at block 104) to the storage location address, such as file path and name, in the archival storage 4 where the object is stored. The archive policy 36 is set (at block 106) to the archival policy specified for the object being added.

If (at block 108) the archive policy is an event based retention policy, then the status 40 in the added object entry 30 is set (at block 110) to "pending", indicating that the retention period has not yet started to run. Otherwise, if (at block 108) the archive policy is not event based, then the retention period begins immediately. In such case, the archive program 12 creates (at block 112) an expiration entry 50 (FIG. 3) in the expiration table 20 including a new expiration ID 52 and object ID 54 of the specified object, where the object ID is the same for the object entry 30 and expiration entry 50. The retention period start 56 is set (at block 114) to the current time, as indicated by an archive server 2 clock (not shown), and the retention period 58 is set to the retention period specified in the archive policy defined for the object. The status in the added object entry 30, field 40, and in the added expiration entry 50, field 60, is set (at block 116) to "active".

Figure 5:
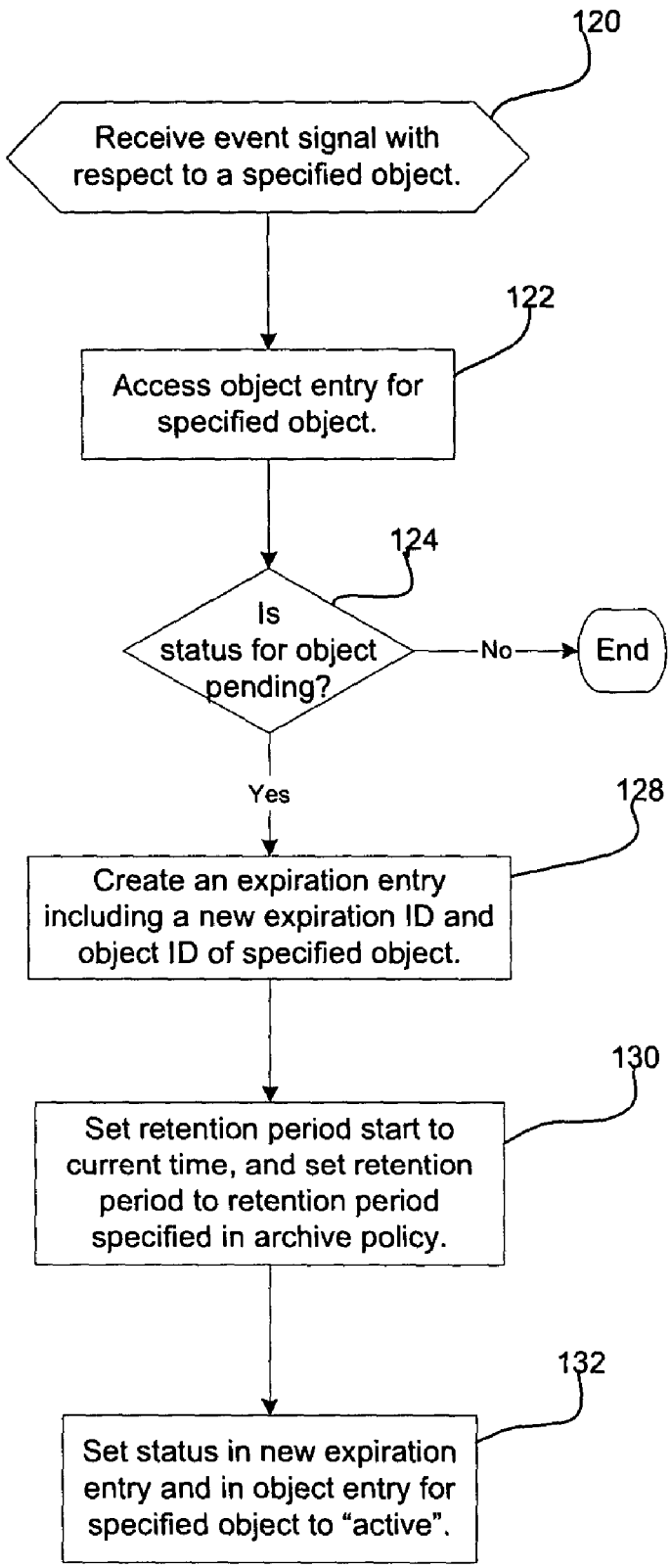

FIG. 5 illustrates operations the archival program 12 performs when receiving an event signal with respect to a specified object entry having an event based retention archive policy. An administrator may query the object table 18 in the archive database 14 to determine all object entries 30 whose status is "pending", indicating that the object has an event based retention policy that has not been triggered by receiving indication of the event occurring. Upon determining the object ID of the object whose retention period the administrator wants to activate, the administrator may use an interface, such as a command line interface or graphical user interface, to transmit an event signal to the archive program specifying the object ID of the object to which the event is directed. Additionally, an event signal may be generated by some program that determines the existence of a state for which an event should be signaled for an archived object. Upon receiving (at block 120) the event signal for a specified object ID, the archive program 12 accesses (at block 122) the object entry 30 in the object table 18 for the specified object.

If (at block 124) the status for the object is not "pending", then control ends because the retention period for the object was previously activated, which for an event based retention policy would occur if the event signal was previously received. Otherwise, if the status is pending, then the archive program 12 creates (at block 128) an expiration entry 50 (FIG. 3) including a new expiration ID 52 and the object ID 54 of the specified object to which the event is directed. The retention period start 56 field is set (at block 130) to the current time at the archive server 2 and the retention period is set to the retention period specified in the archive policy 36 of the accessed object entry 30. Further, the statuses 40 and 60 in the object entry 30 for the specified object and the new expiration entry 50, respectively, are set (at block 132) to active, indicating that the retention period is running.

With the operations of FIG. 5, the archive program 12 does not begin the retention period specified for an object having an event based retention policy until the event signal has occurred.

Figure 6:
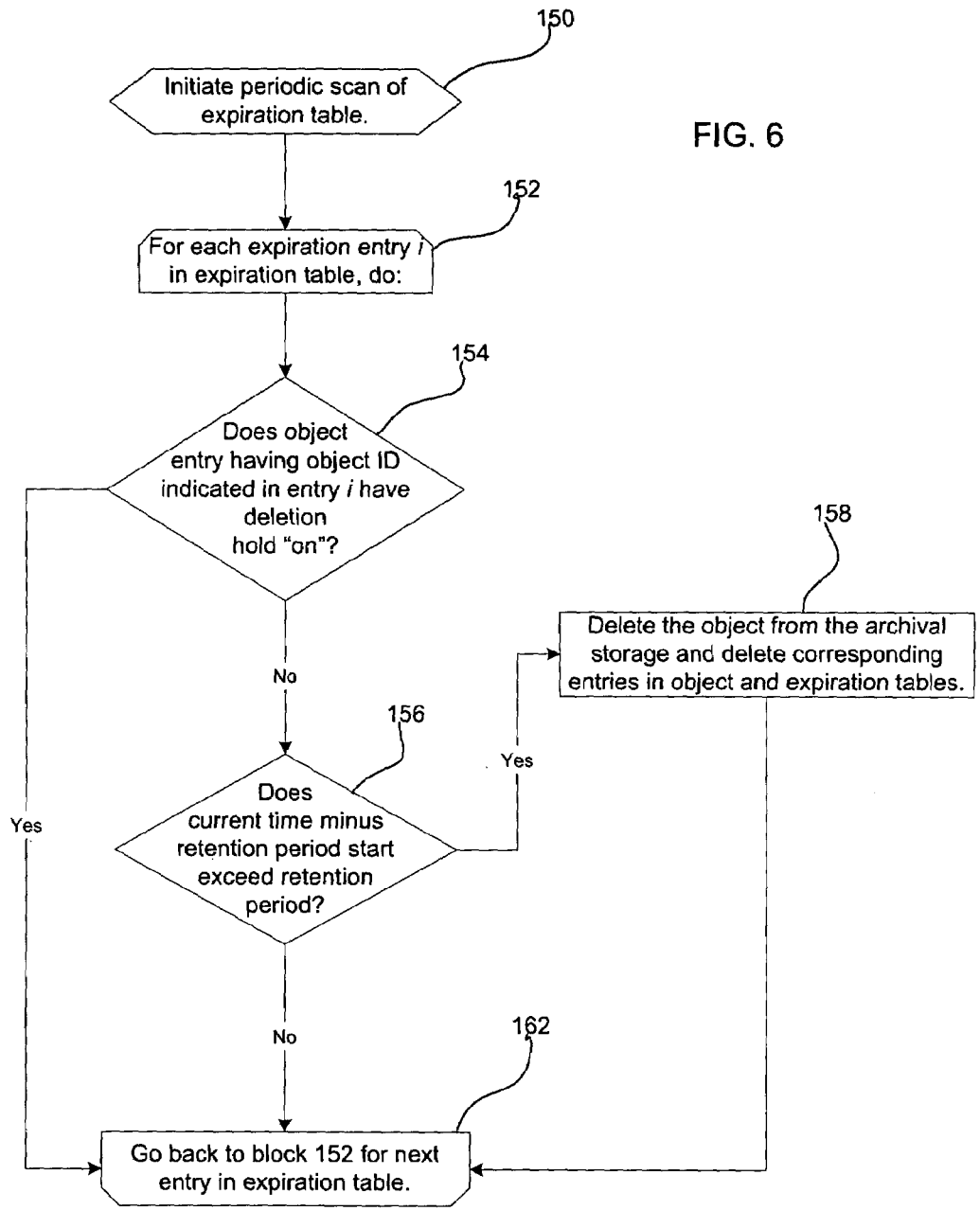

FIG. 6 illustrates operations the archive program 12 performs to process entries in the expiration table 20 to expire archived objects so they are available for reclamation or removal. The archive program 12 may perform periodic scans of the expiration table 20 (at block 150). For each entry i in the expiration table 20, a loop is performed at blocks 152 through 162. At block 154, if the object entry 30 having the object ID 54 indicated in the expiration entry i has the deletion hold 38 set "on", then the object cannot be modified or deleted regardless of the retention period specified by the archive policy. In such case, control proceeds to block 162 to consider the next expiration entry in the expiration table 20. Otherwise, if (at block 154) the deletion hold 38 is "off", indicating that the object may be expired according to the archive policy 36 and if (at block 156) the current server 2 time minus the retention period start 56 exceeds the retention period 58, i.e., the retention period has ended, then the object may be expired. In such case, the archive program 12 deletes (at block 158) the object from the archival storage 4 and deletes the corresponding entries in object 18 and expiration 20 tables. Control then proceeds to block 162 to consider any further entries in the expiration table 20.

As discussed, once an object has an expired status, as indicated in the object entry and expiration entry for the object, that archive object and corresponding object entry may be deleted if a deletion hold is not set for that object.

Figure 7:
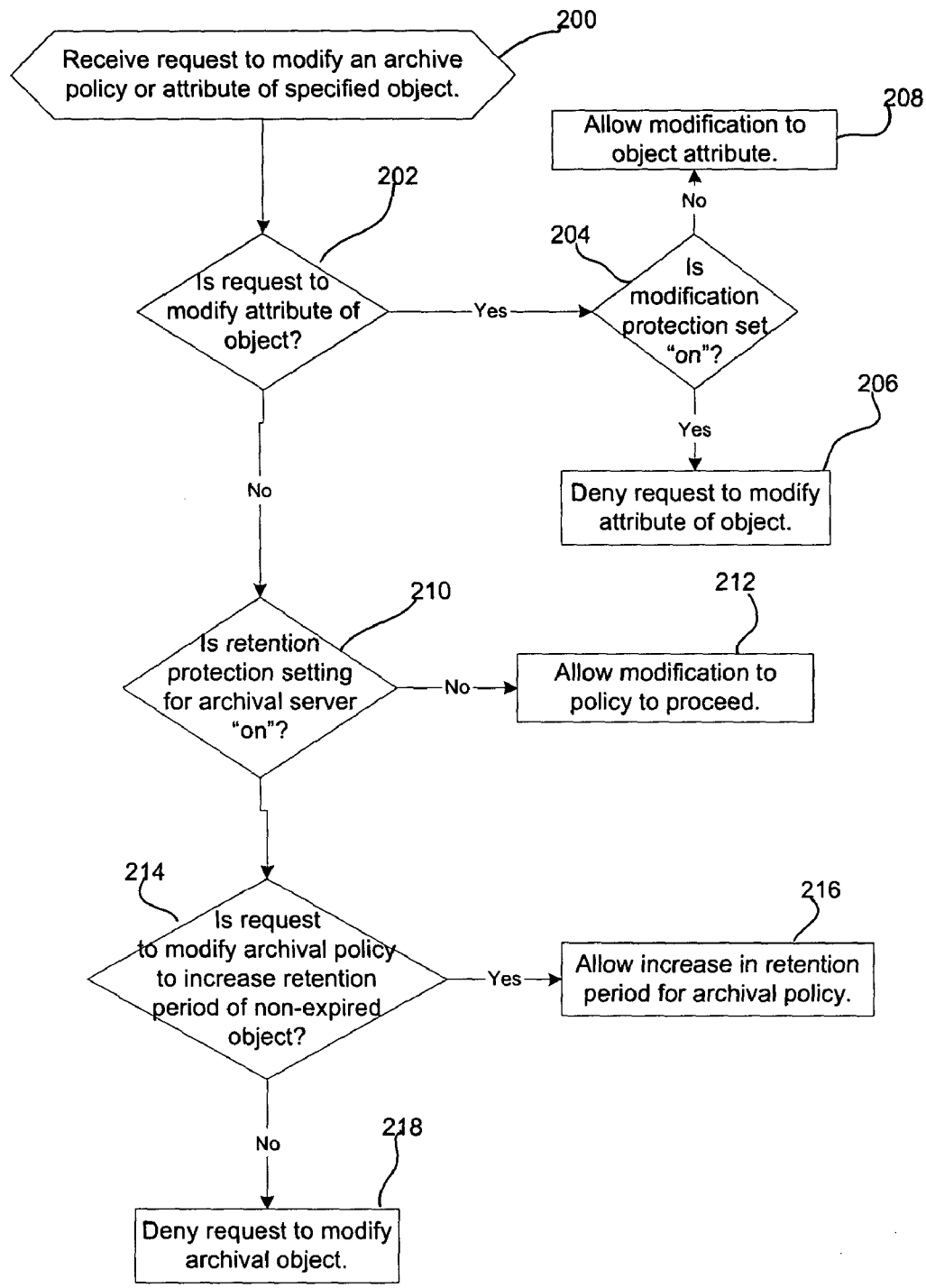

FIG. 7 illustrates operations the archive program 12 performs to handle a request to modify an attribute or archive policy for an archive object in the archival storage 4. Upon receiving (at block 200) the request to modify an attribute or archival policy for a specified object, if (at block 202) the request is to modify an attribute of the specified object and if (at block 204) the modification protection setting 39 is "on", then the request to modify the attribute of object is denied (at block 206); else, if the modification protection setting is "off", the modification to the attribute is allowed (at block 208). If (from the no branch of block 202) the request is to modify an archival policy and if (at block 210) the retention protection setting 16 for the archival server 2 is "off", then the archive program 12 permits (at block 212) the modification to the policy to proceed. Otherwise, if (at block 210) the retention protection setting 16 is "on", then the modification can only proceed if (at block 214) it is a request to increase the retention period, as indicated in the archival policy. If so, then the archive program 12 allows (at block 216) an increase in the retention period for the archival policy by updating the retention period indicated in the archive policy 36 in the accessed object entry 30, which can involve just a change to the retention period or a change in the policy, such as to an event based retention. Otherwise, if the request is to lower the retention period, then the request is denied (at block 218).

Figure 8:
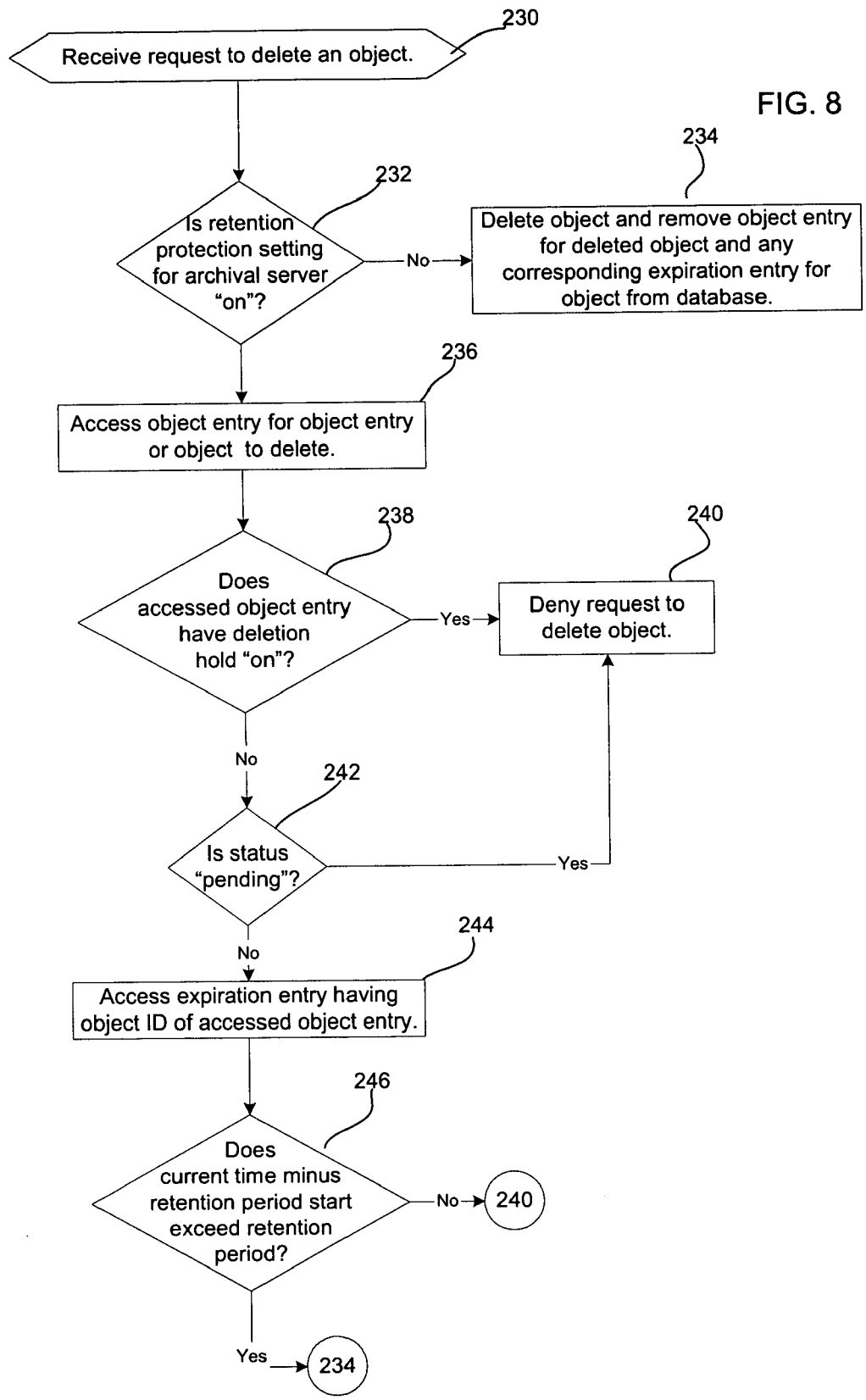

FIG. 8 illustrates operations the archive program 12 performs to handle a request to delete an archived object. Upon receiving a request (at block 230), if (at block 232) the retention protection setting 16 for the archival server 2 is "off", then the archive program 12 permits (at block 234) the deletion of the specified object from the archival storage and the object entry 30 and any corresponding expiration entry 50 for that object are removed from the database 14. If (at block 232) the retention protection setting 16 is "on", then the archive server 12 accesses (at block 236) the object entry 30 for the specified object. If (at block 238) the deletion hold 38 for the accessed object entry is "on", then the delete request is denied (at block 240). Otherwise, if the deletion hold 38 is "off" and if (at block 242) the status 40 in the accessed object entry 30 is "pending", then the object has not expired and the request is denied (at block 240). Otherwise, if the retention period is running (from the no branch of block 242), then the expiration entry 50 corresponding to the object, having the object ID of the specified object, is accessed (at block 244). If (at block 246) the object has expired, i.e., the current time minus the retention period start exceeds retention period, then control proceeds to block 234 to delete the object and remove the object entry and expiration entry for the object from the database 14; otherwise, if the object has not expired, then control proceeds to block 240 to deny the request to delete the archived object.

If the request was to remove a volume or filespace including multiple objects, then the archive program 12 would have to perform the operations of FIG. 8 for each object that would be affected by the request to remove the volume or filespace. Thus, the archive program 12 intercepts and handles all attempts by any user or client 6a, 6b, 6c to modify or delete an archival object or object entry, or filespace or volume including multiple objects.

The described embodiments provide an archival program that allows for archival management operations, including event based retention policies, retention protection to prevent the removal of objects, attribute and archival policy modification prevention, and deletion holds to override the archival policy and retain the object regardless of the archive policy.

Additional Implementation Details

The archival system described herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission medium or from a file server over a network. In such cases, the article of manufacture in which the code is implemented may comprise a transmission medium, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described embodiments, the objects were subject to archiving. However, those skilled in the art will recognize that the above described embodiments for archiving objects may be applied to any storage related operations, such as backup operations.

The described embodiments included event based archive policies and archive policies whose retention period begins running upon creation. In alternative implementations, additional archive policies may be defined for an object.

In described embodiments, information on objects and expiration status was described as implemented in different object and expiration entries 30, 50 in different database tables 18, 20 as shown in FIGS. 2 and 3. In alternative implementations, any combination of tables and record field formats may be used to include the information described with respect to object and expiration entries, such that the entry may be maintained in a single entry in the archive database or dispersed through more than two entries in more than two tables.

In described embodiments, the object and expiration information is maintained in a database, which may comprise a relational database or any other database format known in the art. Additionally, alternative data structure formats or types known in the art may be used to maintain the information described with respect to the object and expiration entries.

FIGS. 4, 5, 6, 7, and 8 describe specific operations occurring in a particular order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

Figure 9:
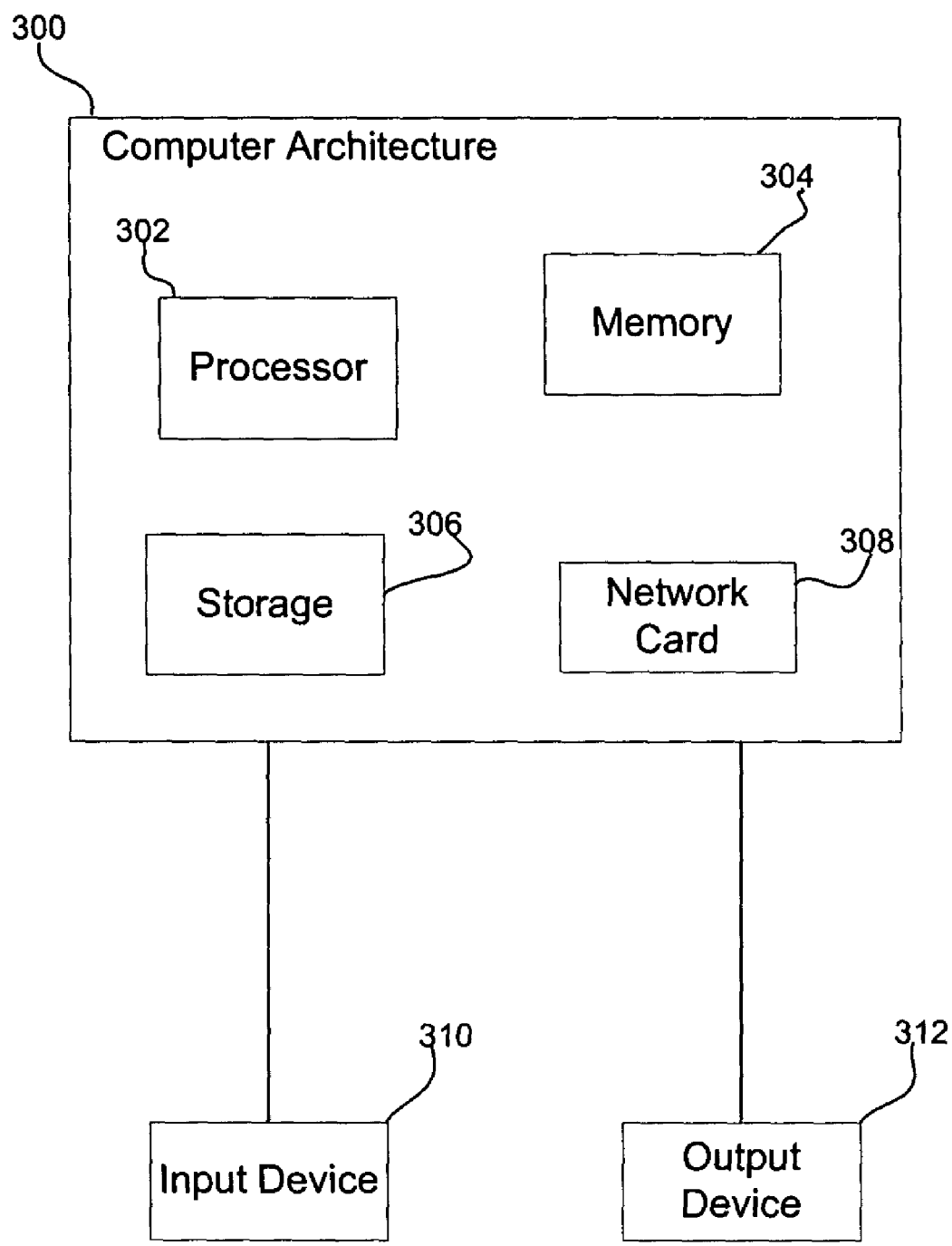
FIG. 9 illustrates a computing architecture that may be used to implement the server and client systems described with respect to FIG. 1.

FIG. 9 illustrates one implementation of a computer architecture 300 of the host system 2 shown in FIG. 1. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs in the storage 306 are loaded into the memory 304 and executed by the processor 302 in a manner known in the art. The architecture further includes a network card 308 to enable communication with a network. An input device 310 is used to provide user input to the processor 302, and may include a keyboard, mouse, pen-stylus, microphone, touch sensitive display screen, or any other activation or input mechanism known in the art. An output device 312 is capable of rendering information transmitted from the processor 302, or other component, such as a display monitor, printer, storage, etc.

The foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for managing retention of stored objects, comprising:
   receiving a modification request with respect to a stored object;
   determining whether a retention protection mechanism is set;
   processing a storage policy associated with the stored object to determine whether the stored object has expired according to the storage policy in response to determining that the retention protection mechanism is set; and
   allowing the modification request to proceed in response to determining that the stored object has expired.

2. The method of claim 1, further comprising:
   allowing the modification request to proceed if the retention protection mechanism is not set; and
   blocking the modification request in response to determining that the retention protection mechanism is set and the stored object has not expired.

3. The method of claim 1, wherein the storage policy specifies a retention period, wherein determining whether the stored object has expired comprises determining whether a difference between a current time and a retention period start exceeds the retention period.

4. The method of claim 3, further comprising:
   determining whether the modification request is to increase the retention period specified for the storage policy in response to determining that the retention protection is set and the stored object has not expired;
   allowing the modification request to increase the retention period if the modification request is determined to increase the retention period; and
   blocking the modification request if the modification request is determined to not increase the retention period.

5. The method of claim 3, wherein the storage policy may comprise an event based retention policy, wherein for the event based retention policy, the retention period start begins in response to receiving an event signal, and wherein the object having an event based retention policy does not expire until after the event signal is received and the difference between the current time and the retention period start exceeds the retention period.

6. The method of claim 1, wherein the modification request comprises a request to delete the object, further comprising:
   determining whether a deletion hold is set for the stored object; and
   blocking the deletion request if the deletion hold is set regardless of whether the stored object has expired.

7. The method of claim 6, further comprising:
   receiving indication that the deletion hold for one stored object is released, wherein deletion requests directed to the stored object after the deletion hold is released may proceed if the stored object has expired.

8. A method for storing objects, comprising:
   receiving an object to store and a storage policy associated with the object, wherein the storage policy specifies a retention period;
   generating object information for the received object indicating a storage policy including a retention period, wherein the stored object expires when a difference between a current time and a retention period start exceeds the retention period; and
   determining whether the storage policy comprises an event based retention policy, wherein for the event based retention policy, the retention period start commences in response to receiving an event signal, and wherein the object having an event based retention policy does not expire until after the event signal is received and the difference between the current time and the retention period start exceeds the retention period; and
   setting status information to indicate that the event signal has not been received in response to determining that the storage policy comprises one event based retention policy.

9. The method of claim 8, further comprising:
   determining that the retention period start commences for a specified object in response to determining that storage policy for the specified object does not comprise one event based retention policy or in response to receiving the event signal for the specified object.

10. The method of claim 9, further comprising:
generating expiration information indicating the retention period start as a current time and the retention period specified in the storage policy in response to determining that the retention period start commences.

11. The method of claim 10, further comprising:
processing the expiration information for each stored object to determine whether the current time exceeds the retention period start plus the retention period; and
deleting the object, object information, and expiration information for one object in response to determining that the current time exceeds the retention period start plus the retention period for the object.

12. The method of claim 8, wherein a minimum retention is associated with the event based retention policy, wherein the stored object is not expired if a time since the object was stored is less than the minimum retention period.

13. The method of claim 8, wherein one stored object cannot be removed if the stored object has not expired according to the storage policy.

14. The method of claim 8, wherein one event based retention policy has a retention period that expires upon receiving the event signal.

15. A system for managing retention of stored objects, comprising:
means for receiving a modification request with respect to a stored object;
means for determining whether a retention protection mechanism is set;
means for processing a storage policy associated with the stored object to determine whether the stored object has expired according to the storage policy in response to determining that the retention protection mechanism is set; and
means for allowing the modification request to proceed in response to determining that the stored object has expired.

16. The system of claim 15, further comprising:
means for allowing the modification request to proceed if the retention protection mechanism is not set; and
means for blocking the modification request in response to determining that the retention protection mechanism is set and the stored object has not expired.

17. The system of claim 15, wherein the storage policy specifies a retention period, wherein the means for determining whether the stored object has expired determines whether a difference between a current time and a retention period start exceeds the retention period.

18. The system of claim 17, further comprising:
means for determining whether the modification request is to increase the retention period specified for the storage policy in response to determining that the retention protection is set and the stored object has not expired;
means for allowing the modification request to increase the retention period if the modification request is determined to increase the retention period; and
means for blocking the modification request if the modification request is determined to not increase the retention period.

19. The system of claim 17, wherein the storage policy may comprise an event based retention policy, wherein for the event based retention policy, the retention period start begins in response to receiving event signal, and wherein the object having an event based retention policy does not expire until after the event signal is received and the difference between the current time and the retention period start exceeds the retention period.

20. The system of claim 15, wherein the modification request comprises a request to delete the object, further comprising:
means for determining whether a deletion hold is set for the stored object; and
means for blocking the deletion request if the deletion hold is set regardless of whether the stored object has expired.

21. The system of claim 20, further comprising:
means for receiving indication that the deletion hold for one stored object is released, wherein deletion requests directed to the stored object after the deletion hold is released may proceed if the stored object has expired.

22. A system for storing objects, comprising: means for receiving an object to store and a storage policy associated with the object, wherein the storage policy specifies a retention period;
means for generating object information for the received object indicating a storage policy including a retention period, wherein the stored object expires when a difference between a current time and a retention period start exceeds the retention period; and
means for determining whether the storage policy comprises an event based retention policy, wherein for the event based retention policy, the retention period start commences in response to receiving an event signal, and wherein the object having an event based retention policy does not expire until after the event signal is received and the difference between the current time and the retention period start exceeds the retention period; and
means for setting status information to indicate that the event signal has not been received in response to determining that the storage policy comprises one event based retention policy.

23. The system of claim 22, further comprising:
means for determining that the retention period start commences for a specified object in response to determining that storage policy for the specified object does not comprise one event based retention policy or in response to receiving the event signal for the specified object.

24. The system of claim 23, further comprising:
means for generating expiration information indicating the retention period start as a current time and the retention period specified in the storage policy in response to determining that the retention period start commences.

25. The system of claim 24, further comprising:
means for processing the expiration information for each stored object to determine whether the current time exceeds the retention period start plus the retention period; and
means for deleting the object, object information, and expiration information for one object in response to determining that the current time exceeds the retention period start plus the retention period for the object.

26. The system of claim 22, wherein a minimum retention is associated with the event based retention policy, wherein the stored object is not expired if a time since the object was stored is less than the minimum retention period.

27. The system of claim 22, wherein one stored object cannot be removed if the stored object has not expired according to the storage policy.

28. The system of claim 22, wherein one event based retention policy has a retention period that expires upon receiving the event signal.

29. An article of manufacture for managing retention of stored objects, wherein the article of manufacture comprises a computer readable storage medium including code that is executed to cause operations to be performed, the operations comprising:
receiving a modification request with respect to a stored object;
determining whether a retention protection mechanism is set;
processing a storage policy associated with the stored object to determine whether the stored object has expired according to the storage policy in response to determining that the retention protection mechanism is set; and
allowing the modification request to proceed in response to determining that the stored object has expired.

30. The article of manufacture of claim 29, wherein the operations further comprise:
allowing the modification request to proceed if the retention protection mechanism is not set; and
blocking the modification request in response to determining that the retention protection mechanism is set and the stored object has not expired.

31. The article of manufacture of claim 29, wherein the storage policy specifies a retention period, wherein determining whether the stored object has expired comprises determining whether a difference between a current time and a retention period start exceeds the retention period.

32. The article of manufacture of claim 31, wherein the operations further comprise:
determining whether the modification request is to increase the retention period specified for the storage policy in response to determining that the retention protection is set and the stored object has not expired;
allowing the modification request to increase the retention period if the modification request is determined to increase the retention period; and
blocking the modification request if the modification request is determined to not increase the retention period.

33. The article of manufacture of claim 31, wherein the storage policy may comprise an event based retention policy, wherein for the event based retention policy, the retention period start begins in response to receiving an event signal, and wherein the object having an event based retention policy does not expire until after the event signal is received and the difference between the current time and the retention period start exceeds the retention period.

34. The article of manufacture of claim 29, wherein the modification request comprises a request to delete the object, further comprising:
determining whether a deletion hold is set for the stored object; and
blocking the deletion request if the deletion hold is set regardless of whether the stored object has expired.

35. The article of manufacture of claim 34, wherein the operations further comprise:
receiving indication that the deletion hold for one stored object is released, wherein deletion requests directed to the stored object after the deletion hold is released may proceed if the stored object has expired.

36. An article of manufacture for storing objects, wherein the article of manufacture comprises a computer readable storage medium including code that is executed to cause operations to be performed, the operations comprising:
receiving an object to store and a storage policy associated with the object, wherein the storage policy specifies a retention period;
generating object information for the received object indicating a storage policy including a retention period, wherein the stored object expires when a difference between a current time and a retention period start exceeds the retention period; and
determining whether the storage policy comprises an event based retention policy, wherein for the event based retention policy, the retention period start commences in response to receiving an event signal, and wherein the object having an event based retention policy does not expire until after the event signal is received and the difference between the current time and the retention period start exceeds the retention period; and
setting status information to indicate that the event signal has not been received in response to determining that the storage policy comprises one event based retention policy.

37. The article of manufacture of claim 36, wherein the operations further comprise:
determining that the retention period start commences for a specified object in response to determining that storage policy for the specified object does not comprise one event based retention policy or in response to receiving the event signal for the specified object.

38. The article of manufacture of claim 37, wherein the operations further comprise:
generating expiration information indicating the retention period start as a current time and the retention period specified in the storage policy in response to determining that the retention period start commences.

39. The article of manufacture of claim 38, wherein the operations further comprise:
processing the expiration information for each stored object to determine whether the current time exceeds the retention period start plus the retention period; and
deleting the object, object information, and expiration information for one object in response to determining that the current time exceeds the retention period start plus the retention period for the object.

40. The article of manufacture of claim 36, wherein a minimum retention is associated with the event based retention policy, wherein the stored object is not expired if a time since the object was stored is less than the minimum retention period.

41. The article of manufacture of claim 36, wherein one stored object cannot be removed if the stored object has not expired according to the storage policy.

42. The article of manufacture of claim 36, wherein one event based retention policy has a retention period that expires upon receiving the event signal.

* * * * *

UNITED STATES PATENT AND TRADEMARK OFFICE
CERTIFICATE OF CORRECTION

PATENT NO.        : 7,117,322 B2
APPLICATION NO.   : 10/658487
DATED             : October 3, 2006
INVENTOR(S)       : Avishai H. Hochberg et al.

It is certified that error appears in the above-identified patent and that said Letters Patent is hereby corrected as shown below:

On the Title Page
Change Item (75) on the title page to list after "Avishai Haim Hochberg, San Jose, CA (US); Toby Lynn Marek, Santa Clara, CA (US); David Maxwell Cannon, Tucson, AZ (US); Howard Newton Martin, Tucson, AZ (US); Donald Paul Warren Jr., Tucson, AZ (US); Mark Alan Haye, Tucson AZ (US)" the following inventor "; Alan L. Stuart, Scarsdale, NY (US)".

Signed and Sealed this
Twenty-fifth Day of October, 2011

David J. Kappos
*Director of the United States Patent and Trademark Office*